(12) United States Patent
Albert et al.

(10) Patent No.: US 7,490,518 B2
(45) Date of Patent: Feb. 17, 2009

(54) SYSTEM AND METHOD OF OPERATION OF AN EMBEDDED SYSTEM FOR A DIGITAL CAPACITANCE DIAPHRAGM GAUGE

(75) Inventors: David M Albert, Allen, TX (US); Edwin K Arrant, Plano, TX (US); Marvin B Edwards, Coppell, TX (US)

(73) Assignee: Celerity, Inc., Austin, TX (US)

( * ) Notice: Subject to any disclaimer, the term of this patent is extended or adjusted under 35 U.S.C. 154(b) by 101 days.

(21) Appl. No.: 11/369,885

(22) Filed: Mar. 7, 2006

(65) Prior Publication Data

US 2006/0219018 A1  Oct. 5, 2006

Related U.S. Application Data

(60) Continuation of application No. 10/848,739, filed on May 19, 2004, now Pat. No. 7,010,983, which is a division of application No. 10/063,991, filed on May 31, 2002, now Pat. No. 6,910,381.

(51) Int. Cl.
*G01L 7/00* (2006.01)
(52) U.S. Cl. .......................................... 73/714; 73/708
(58) Field of Classification Search ........... 73/700–756; 361/283.1–283.4
See application file for complete search history.

(56) References Cited

U.S. PATENT DOCUMENTS

| 4,598,381 | A |   | 7/1986 | Cucci |
|---|---|---|---|---|
| 4,644,482 | A |   | 2/1987 | Juanarena |
| 4,818,994 | A | * | 4/1989 | Orth et al. ............... 340/870.21 |
| 4,866,435 | A |   | 9/1989 | Frick |

(Continued)

FOREIGN PATENT DOCUMENTS

EP   A2-0 400 500   12/1990

(Continued)

OTHER PUBLICATIONS

International Search Report for PCT/US03/16911 mailed Nov. 3, 2003.

(Continued)

*Primary Examiner*—Andre J. Allen
*Assistant Examiner*—Jermaine Jenkins
(74) *Attorney, Agent, or Firm*—Lowrie, Lando & Anastasi, LLP

(57) ABSTRACT

Systems and methods for digitally controlling sensors. In one embodiment, a digital controller for a capacitance diaphragm gauge is embedded in a digital signal processor (DSP). The controller receives digitized input from a sensor AFE via a variable gain module, a zero offset module and an analog-to-digital converter. The controller automatically calibrates the received input by adjusting the variable gain and zero offset modules. The controller also monitors and adjusts a heater assembly to maintain an appropriate temperature at the sensor. The controller utilizes a kernel module that allocates processing resources to the various tasks of a gauge controller module. The kernel module repetitively executes iterations of a loop, wherein in each iteration, all of a set of high priority tasks are performed and one of a set of lower priority tasks are performed. The controller module thereby provides sensor measurement output at precisely periodic intervals, while performing ancillary functions as well.

20 Claims, 3 Drawing Sheets

U.S. PATENT DOCUMENTS

| | | | |
|---|---|---|---|
| 5,564,434 A | 10/1996 | Halperin et al. | |
| 5,625,144 A * | 4/1997 | Chang | 73/146.3 |
| 5,747,696 A * | 5/1998 | Kwun et al. | 73/728 |
| 5,754,596 A | 5/1998 | Bischoff et al. | |
| 5,946,642 A * | 8/1999 | Hedrick | 702/138 |
| 6,125,291 A | 9/2000 | Miesel et al. | |
| 6,182,019 B1 * | 1/2001 | Wiklund | 702/100 |
| 6,289,259 B1 | 9/2001 | Choi et al. | |
| 6,318,181 B1 * | 11/2001 | Shimomoto et al. | 73/709 |
| 6,329,825 B1 * | 12/2001 | Tanaka et al. | 324/725 |
| 6,389,371 B1 | 5/2002 | Tsuchiya et al. | |
| 6,516,672 B2 * | 2/2003 | Wang | 73/718 |
| 6,687,635 B2 * | 2/2004 | Horne et al. | 702/86 |
| 6,910,381 B2 | 6/2005 | Albert et al. | |
| 7,010,983 B2 | 3/2006 | Albert et al. | |
| 7,076,920 B2 | 7/2006 | Holcomb et al. | |
| 2006/0107746 A1 | 5/2006 | Albert et al. | |

FOREIGN PATENT DOCUMENTS

WO      WO98/00943      1/1998

OTHER PUBLICATIONS

Communication Pursuant to Article 96(2) EPC in European Search Report for EP 03731440.8 mailed Dec. 4, 2006.

* cited by examiner

SYSTEM AND METHOD OF OPERATION OF AN EMBEDDED SYSTEM FOR A DIGITAL CAPACITANCE DIAPHRAGM GAUGE

RELATED APPLICATION

This application is a continuation of, and claims the benefit under 35 U.S.C. §120 to, U.S. patent application Ser. No. 10/848,739, filed May 19, 2004, entitled "SYSTEM AND METHOD OF OPERATION OF AN EMBEDDED SYSTEM FOR A DIGITAL CAPACITANCE DIAPHRAGM GAUGE," now U.S. Pat. No. 7,010,938, which is a division of, and claims the benefit under 35 U.S.C. §120 to, U.S. patent application Ser. No. 10/063,991, filed May 31, 2002, entitled "SYSTEM AND METHOD OF OPERATION OF AN EMBEDDED SYSTEM FOR A DIGITAL CAPACITANCE DIAPHRAGM GAUGE," now U.S. Pat. No. 6,910,381, each of which is hereby incorporated herein by reference in its entirety.

BACKGROUND OF INVENTION

1. Technical Field of the Invention

This invention relates generally to the systems and methods for operation of sensors and more particularly to embedded control systems for a digital capacitance diaphragm gauge using an advanced digital signal processor, including kernel and gauge control algorithms to process internal gauge functions.

2. Background of the Invention

Many manufacturing processes require accurate and repeatable pressure measurements during critical process steps. These processes may rely on capacitance diaphragm gauges to achieve an accurate determination of process chamber pressure. Capacitance diaphragm gauges (or capacitance manometers) are widely used in the semiconductor industry. In part, this is because they are typically well suited to the corrosive services of this industry. They are also favored because of their high accuracy and immunity to contamination.

A capacitance manometer is a type of sensor which may be used to measure parameters such as the pressure within a process chamber. A capacitance manometer has a housing containing two chambers separated by a diaphragm. One of the chambers is in fluid communication with the process chamber or conduit in which the pressure is to be measured.

The other chamber of the manometer is a typically (although not necessarily) evacuated. It is a pressure reference chamber. Plates are located on the manometer housing and on the diaphragm. These plates have a capacitance that can be measured. When the process gas enters the first chamber, it exerts a pressure against the diaphragm and causes the diaphragm to move. The capacitive plate connected to the diaphragm is consequently moved toward the plate connected to the manometer housing, changing the capacitance between the plates. The change in capacitance corresponds to the increase in pressure and can be used as a measurement of the pressure.

Capacitance manometers typically operate by measuring the change in electrical capacitance that results from the relative movement of the sensing electrodes. The change in capacitance can be measured using various different types of electrical interfaces, such as balanced diode bridge interfaces, guarded secondary transformer-based bridge interfaces, and matched reference capacitor bridge interfaces. These interfaces measure changes in capacitance, using circuitry coupled to the capacitive plates of the manometer in order to determine changes in their capacitance and corresponding changes in the measured parameter.

One of the major advantages of a capacitance diaphragm gauge is its ability to detect extremely small diaphragm movements, hence extremely small changes in the measured process parameter. The accuracy of these sensors is typically 0.25 to 0.5% of the generated reading. For example, in a typical capacitance diaphragm pressure sensor, a thin diaphragm can measure down to $10^{-5}$ Torr. Thicker, but more rugged diaphragms can measure in the low vacuum to atmospheric range. To cover a wide vacuum range, two or more capacitance sensing heads can be connected into a multi-range package.

Systems that utilize differential capacitance manometers generally have stringent requirements for the repeatability of pressure readings, with offset drift typically limited to 0.02% of full scale per day. Full scale deflection for a differential capacitance manometer typically causes capacitance changes of 0.2 2.0 pF ($10^{-12}$ F). Thus, the electronic interface ("Analog Front End" or "AFE") to the sensing element may not experience drift in excess of 0.04 femtoFarad ($10^{-15}$ F) per day.

In addition to stringent performance requirements, customers are increasingly requiring features that allow differential capacitance manometer based systems to take advantage of advancements in other process equipment. For example, digital communications, embedded diagnostics and lower temperature sensitivity are now required by some of the latest process technologies. Legacy capacitance diaphragm gauges often cannot meet these requirements.

SUMMARY OF INVENTION

One or more of the problems outlined above may be solved by the various embodiments of the invention. Broadly speaking, the invention comprises systems and methods for digitally controlling sensors. The various embodiments of the invention may substantially reduce or eliminate the disadvantages and issues associated with prior art systems and methods for operating sensors.

In one embodiment, a digital controller for a capacitance diaphragm gauge is embedded in a digital signal processor (DSP). The controller receives digitized input from a sensor analog front end via a variable gain module, a zero offset module and an analog-to-digital converter (ADC). The controller automatically scales the received input by adjusting the variable gain and zero offset modules. The controller also monitors and adjusts a heater assembly to maintain an appropriate temperature at the sensor. The controller utilizes a kernel software module that allocates processing resources to the various tasks of a gauge controller module. The kernel module repetitively executes iterations of a loop, wherein in each iteration, all of a set of high priority tasks are performed and one of a set of lower priority tasks are performed. The controller module thereby provides sensor measurement output at precisely periodic intervals, while performing ancillary functions (e.g., automatic scaling, zero offset adjustment and embedded diagnostics) as well.

The present systems and methods may provide a number of advantages over the prior art. For example, they may enable the controller to simultaneously service the digital tool controller interface and the embedded diagnostics port interface. Further, they may enable embedded diagnostics within the controller. The digital engine of the controller can discretely monitor system variables and seamlessly present the data to the tool controller and/or the embedded diagnostics port. System variables may include but are not limited to the gauge pressure, sensor temperature(s), heater drive(s), ambient temperature, preprocessed gauge pressure, zero offset, and device status. Still further, there is no need for potentiometers for manual adjustments in the present systems and methods. Except for a single gauge balancing resistor manually installed during assembly, all calibration adjustments are made digitally by an automated calibration stand. All calibration parameters are stored in nonvolatile memory and are accessible via the embedded diagnostics port. Still further, the present systems and methods may enable linearization of the gauge and configuration of the sensor heater controller via the embedded diagnostics port.

BRIEF DESCRIPTION OF DRAWINGS

Other objects and advantages of the invention may become apparent upon reading the following detailed description and upon reference to the accompanying drawings.

Figure 1:
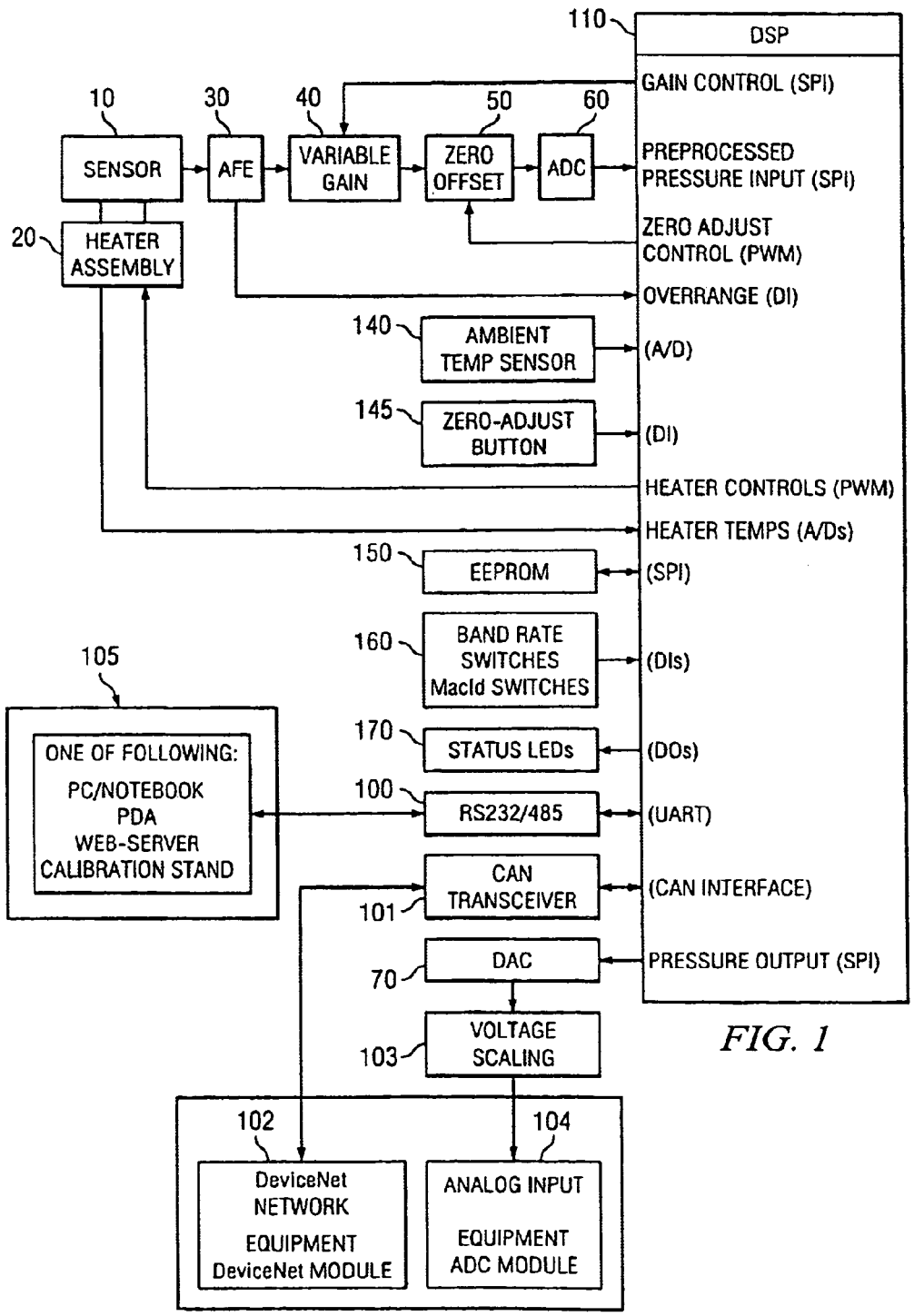
FIG. 1 is a hardware block diagram illustrating an embedded system controller in one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

Overview.

A preferred embodiment of the invention is described below. It should be noted that this and any other embodiments described below are exemplary and are intended to be illustrative of the invention rather than limiting.

Broadly speaking, the invention comprises systems and methods for digitally controlling sensors. The various embodiments of the invention may substantially reduce or eliminate the disadvantages and issues associated with prior art systems and methods for operating sensors.

In one embodiment, a digital controller for a capacitance diaphragm gauge is embedded in a digital signal processor (DSP). The controller receives digitized input from a sensor AFE via a variable gain module, a zero offset module and an analog-to-digital converter (ADC). The controller automatically scales the received input by adjusting the variable gain and zero offset modules. The controller also monitors and adjusts a heater assembly to maintain an appropriate temperature at the sensor.

The controller utilizes a kernel module that allocates processing resources to the various tasks of a gauge controller module. The kernel module repetitively executes iterations of a loop, wherein in each iteration, all of a set of high priority tasks are performed and one of a set of lower priority tasks is performed. In one embodiment, the high priority tasks comprise reading the digitized input from the sensor, linearizing the input, and providing a pressure output. The lower priority tasks comprise servicing serial communication interface (SCI) messages, servicing control area network (CAN) messages, compensating for ambient temperature, controlling the sensor heater, controlling temperature and status LEDs, checking for zero pressure and overpressure and the like.

The digital engine of the controller monitors system variables for the purpose of producing accurate, repeatable, and temperature compensated pressure output, while simultaneously supporting a digital tool controller interface, an independent diagnostics interface, a closed loop heater controller and other gauge functionality. All of these functions are executed without affecting the accuracy or performance of the gauge.

Advantages. In order to meet many of the new requirements for differential capacitance manometer systems, a digital control system may be required. Traditional analog signals are susceptible to noise, ground loops, and signal loss. These issues can be resolved with digital communications, due to their immunity to noise and signal degradation. In one embodiment, a digital communication interface on the gauge is implemented using an embedded digital control system.

The prior art provides few, if any, diagnostic features. Traditional analog gauges must be removed from the tool to be diagnosed. Using the present systems and methods, the gauges need not be removed in order to diagnose or resolve problems. Internal system parameters may be monitored or retrieved during normal operation through, for example, a digital diagnostics port, or an interface to a PC, notebook computer, PDA or calibration stand. The gauges may also include embedded diagnostics to facilitate resolution of tool or gauge problems. Such features may reduce the cost of ownership by allowing tool or sensor issues to be quickly identified and resolved.

Conventional analog gauges are calibrated by adjusting a number of potentiometers through a process that is primarily one of manual calibration. The present systems and methods, however, may provide for automatic calibration (e.g., by an automated calibration stand). In one embodiment, an embedded digital engine enables automated calibration and testing, which lowers the cost of manufacturing and reduces variability from device to device. No potentiometers are required, in contrast to the prior art. Since calibration is done digitally and automatically, there is much less chance of human induced variability. Higher levels of accuracy, repeatability, and device-to-device reproducibility are therefore possible.

High performance capacitance diaphragm gauges are typically subject to temperature coefficient requirements. That is, the sensitivity of the gauges to temperature variations should be minimal. Reducing temperature coefficient values generally requires a precision sensor heater control system. Advanced heater control is also facilitated by the present systems and methods, which use digital techniques to monitor and control heater output. The present systems and methods also utilize measurements of ambient temperature to compensate for variations in the temperature of the electronic circuit.

The present systems and methods therefore provide high levels of gauge performance, while enabling simultaneous digital communications with host equipment and diagnostics facilities. Furthermore, the present systems and methods may reduce the cost of manufacturing of the gauges and the cost of ownership of the end user.

Preferred Embodiment

Referring to FIG. 1, a functional block diagram illustrating the structure of a sensor system having a digital controller is shown. In the embodiment depicted in this figure, a controller is implemented in a digital signal processor (DSP) 110. In other embodiments, the controller may be implemented in a microcontroller or other data processor. The controller receives digitized input from the sensor 10, processes the input, controls the sensor and related components, performs various service functions and provides output data to a user. In one embodiment, the controller DSP is embedded in (integral with) the sensor.

Pressure Acquisition. In this embodiment, a signal from the sensor (e.g., capacitance diaphragm gauge) 10 is converted to a voltage by the Analog Front End (AFE) 30. The AFE signal is then amplified by a programmable gain amplifier 40 and zero adjusted by a zero offset module 50. Both programmable gain amplifier 40 and zero offset module 50 are controlled by the embedded controller, DSP 110. The amplified and offset analog signal is then converted to a digital signal by analog-to-digital converter (ADC) 60. ADC 60 then communicates the digital signal to the processor upon command from the embedded control code.

Programmable gain amplifier 40 and zero offset module 50 are used to modify the signal generated by AFE 30 because sensor outputs can vary significantly from one sensor to another. The signal is therefore automatically adjusted to appropriate levels prior to digitization. These components replace the potentiometers used in prior art systems for gain and offset adjustments. By eliminating the potentiometers, which are susceptible to incorrect adjustment and which typically have high temperature coefficients, gauge performance is improved.

Signal Processing. The digitized pressure signal received by DSP 110 is processed using digital techniques to convert the nonlinear sensor signal to a linear pressure signal. This process employs a linearization algorithm that is based on constants computed during the automatic calibration of the controller. These constants are maintained in non-volatile memory in the EEPROM 150. A temperature compensation algorithm is also used to process the signal to compensate for temperature variations in the electronics.

After the digital signal is processed by the DSP, it can be sent to one or more output ports. The digital signal can be transmitted directly to a digital device or network, such as control area network (CAN) transceiver 101, which can then make it available to a DeviceNet network 102, or an RS232/485 embedded diagnostics port, through which it can be made available to a calibration stand, PC, or other devices. The processed digital signal may also be sent to a digital-to-analog converter (DAC) 70 to produce an analog signal suitable for an analog The analog signal may be scaled by circuit 103 and linearized by an algorithm if necessary prior to being conveyed to the device 104.

Zero Offset. The zero offset is the output of the gauge when it is exposed to a base pressure or a pressure which is below the detection resolution of the gauge. One of the problems with conventional CDGs is control of zero offset drift in the gauge. Most gauges will experience some drift or shifting of the zero offset value over time. The gauges therefore need to be periodically adjusted to compensate for the drift. Conventional gauges require that a user (e.g., a technician) adjust a potentiometer until the gauge output shows zero volts when it is exposed to base pressure.

The present systems and methods simplify this zero adjust procedure by eliminating the adjustment potentiometer. The controller is configured to monitor the pressure signal and automatically adjust zero offset module 50 in response to an appropriate command. Because the adjustment of the zero offset is automatically performed by the controller, the time required to adjust the zero offset is minimized. There is also a reduced risk of incorrect adjustment because the opportunity for human error in adjustment of a potentiometer is eliminated. (It should also be noted that the accuracy of the adjustment is typically substantially greater than can be obtained by manual adjustment of a potentiometer.) The zero adjust procedure may be invoked manually (e.g., by a user pressing a button) or it may be initiated in response to a signal from the tool port, the diagnostics port, contact closure, or even the controller itself.

In one embodiment, the controller incorporates a lock out feature relating to the zero adjust procedure. Adjustment of the zero offset should only be performed when the appropriate conditions exist. If one of these conditions is not met, error may be introduced into the subsequent measurements. In one embodiment, the following conditions should be met before a zero adjust procedure is performed: the inlet pressure should be below the zero adjust limit of the gauge; the sensor should be at the set point temperature; the ambient temperature of the electronics should be within a predetermined range; an overpressure signal should not be asserted; and no fault conditions should exist within the sensor or controller. Because failure to observe these conditions may result in improper adjustment, the controller is configured to prevent the zero adjustment from taking place unless these conditions are met.

Variable gain. The controller may also provide for automatic calibration of the system. Because the sensor signal may not have the optimal signal range (i.e., magnitude and displacement from zero), it is at times necessary to adjust the variable gain module, as well as the zero offset module, to obtain the best possible signal to input to the analog-to-digital converter and controller. The controller is configured to provide control inputs to the variable gain and zero offset modules and thereby adjust them. This eliminates the need to manually adjust potentiometers as in conventional systems. By adjusting these modules based on the digitized sensor signal, the accuracy and repeatability of the calibration is improved.

Heater Control. In this embodiment, the controller is also responsible for controlling the sensor heater assembly 20. The heater assembly is necessary in this embodiment because the sensor output is a function of temperature, and because sensor performance may be affected by the condensation of process gasses on the diaphragm of the sensor (a capacitance diaphragm gauge). The controller therefore monitors the temperature of the sensor and adjusts the temperature of the heater assembly to maintain the desired set point temperature at the sensor. The control of the heater is implemented in a closed loop subsystem which is operated in parallel with other system functions and which does not degrade gauge accuracy or performance.

Ambient Temperature Compensation. Ambient temperature also has an effect on the performance of the sensor, although it is generally less than the effect of sensor temperature. The controller is therefore coupled to an ambient temperature sensor 140. The controller receives ambient temperature information from sensor 140 and processes the digital signal to compensate for the effects of ambient temperature.

Digital Communications Ports. As noted above, the controller can provide the processed digital signal to a number of ports for use by various other devices. For instance, the controller may have a CAN interface for sending data to CAN transceiver 101, which can then send the data to a DeviceNet network. The controller likewise has a pressure output port coupled to DAC 70, which can provide an analog signal (corresponding to the digital signal) to external analog devices. Still further, the controller can send the data via a PART (universal asynchronous receiver/transmitter) to an RS232/485 diagnostics port 100. Diagnostics port 100 is independent and is available to enable automatic calibration, testing, and troubleshooting features of the controller. This port enables the controller to provide diagnostic data via a serial link to a PC, laptop, PDA, calibration stand or the like (105). The diagnostics port may also enable remote diagnostics if it is interfaced with an appropriate web server device.

Other Hardware Modules. Other signals monitored by the controller in this embodiment include the address, baud rate selector and MacID switches (160), and various status (e.g., fault) and temperature LEDs (170). The status and temperature LEDs may be driven by embedded diagnostics in the controller. The controller also interfaces with a non-volatile memory (e.g., EEPROM 150) to store calibration and configuration parameters. These hardware features are discussed in more detail elsewhere in this disclosure.

Software. The DSP in which the controller is implemented is programmed to periodically execute certain tasks, including the functional tasks involved in processing sensor signals and the ancillary tasks involved in the diagnostic, calibration and other non-measurement functions. This programming is implemented in one embodiment by a kernel module and a controller module. The kernel module executes continually and allocates processing resources to the various tasks that are to be performed, while the controller module actually performs the tasks.

Kernel Module. As noted above, the kernel in this embodiment of the embedded controller allocates processor resources to the individual tasks of the controller module. Because the primary purpose of the embedded controller is to control a sensor, the first priority of the controller is to service the sensing functions of the system. The kernel is designed to provide precisely periodic service of these functions. In this embodiment, these functions include reading the digitized pressure signal from the analog-to-digital converter, linearizing the digitized pressure signal and providing the linearized signal to the various output ports (particularly those intended specifically for sensor output). By allocating resources to these high priority tasks first, the kernel ensures timely and accurate determination of the sensed pressure.

Since the embedded controller in this embodiment is used in a closed loop pressure control system, it is important that the controller does not induce any variations in its pressure response time. If the functions relating to the processing of the pressure signal were delayed, the pressure control system would effectively be operating with stale data and would produce potentially erroneous control data. The kernel therefore allocates processor resources to the lower priority tasks in such a way as not to delay or interrupt the high priority pressure calculation tasks.

The kernel is paced by a timer which periodically generates interrupts that trigger the high priority pressure calculation tasks. Each interrupt triggers a new iteration of a control flow that includes execution of all of the high priority tasks and, in this embodiment, one of the lower priority tasks. Each high priority task completes execution prior to the next timer interrupt. The remainder of the time before the next interrupt can be used for the lower priority tasks.

In one embodiment, the high priority tasks include: reading the AFE output from the analog-to-digital converter; calculating the linearized pressure output; writing the linearized pressure value to the DAC(s); servicing CAN buffers; and servicing serial port buffers.

The lower priority tasks in this embodiment include: processing serial communication messages (via embedded diagnostics port 100); processing CAN messages (via DeviceNet port 101); updating ambient temperature compensation; servicing closed loop heater algorithm; servicing temperature LEDs; monitoring overpressure and zero adjust inputs; servicing status LEDs 170 and switches 160; and servicing EEPROM 150.

Figure 2:
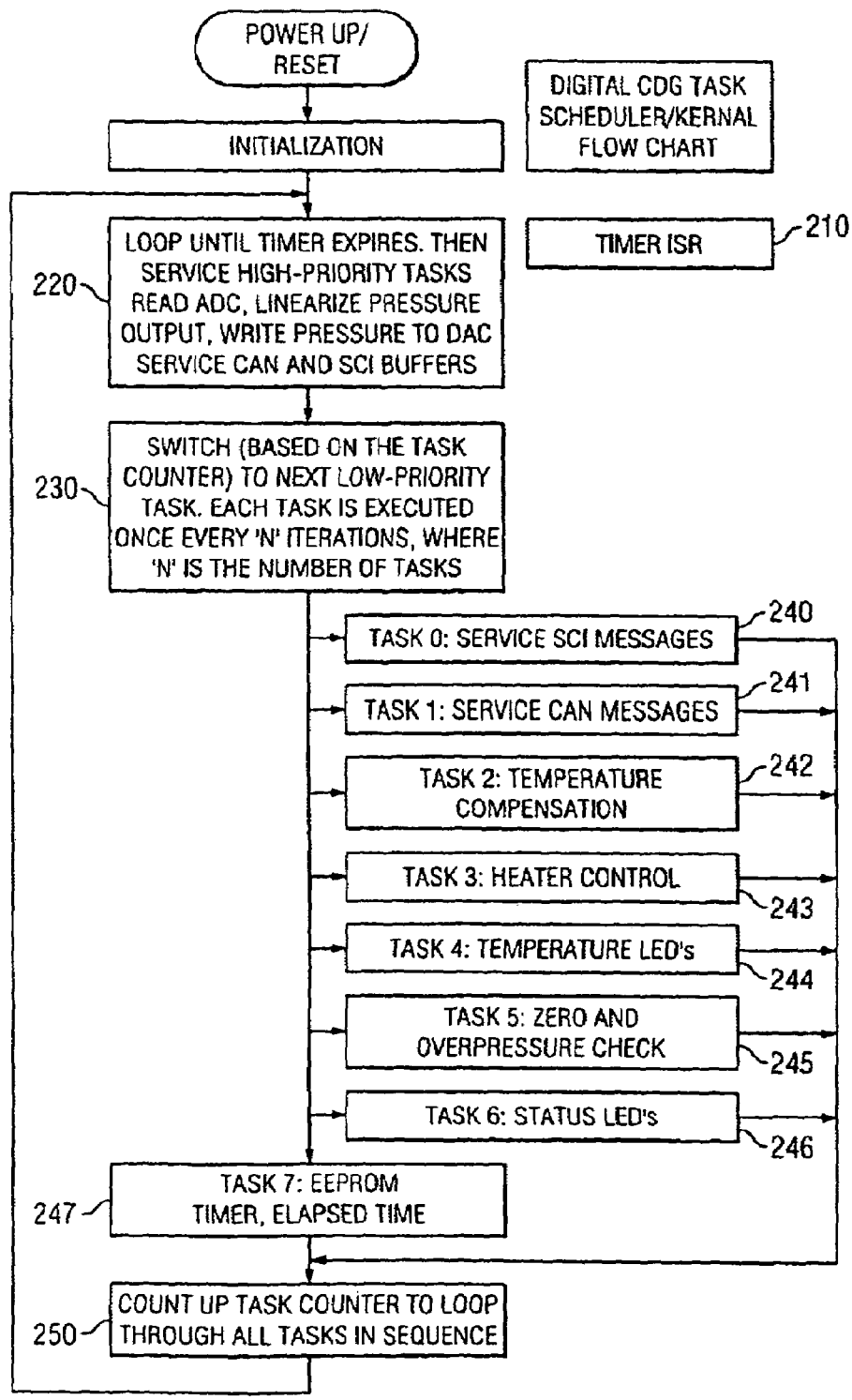
FIG. 2 is a flow chart illustrating the operation of the kernel module of the embedded system in one embodiment.

Referring to FIG. 2, a flow diagram illustrating the operation of the embedded system kernel is shown. Upon power-up (or a reset event), the kernel allocates resources to the initialization of the DSP, including the controller module and the kernel module itself. After initialization is complete, the kernel repetitively executes loop 200, which consists generally of steps 220 and 230. Each iteration of this loop is executed in response to a signal from timer 210, ensuring that the loop is executed in a precisely periodic manner.

Step 220 comprises the tasks that are involved in the processing of sensor output to generate an output signal (i.e., the high priority tasks). In the embodiment described above, these tasks comprise reading the digital signal produced by analog to digital converter 60, linearizing this signal to produce a linear pressure output signal, performing temperature compensation adjustment of the pressure signal and writing the resulting pressure data to the buffers out of the digital to analog converter, CAN and diagnostic (SCI) ports. Each of these tasks is executed once in every iteration of the loop. The measurement function of the sensor controller system therefore has the same periodicity as timer 210.

After the high priority tasks of step 220 are performed, one of the lower priority tasks is selected in step 230. Each of these tasks is shown in the figure as a separate step (240-247). In the embodiment depicted in the figure, the lower priority tasks comprise: servicing SCI messages (240); servicing CAN messages (241); performing temperature compensation (242); performing heater control (243); controlling temperature LEDs (244); performing zero and overpressure checks (245); controlling status LEDs (246); and controlling EEPROM and elapsed-time timers (247). The lower priority task to be executed in a given iteration of the loop is selected based upon a task counter that is incremented upon completion of the lower priority task in each loop (see step 250). Consequently, the lower priority tasks of steps 240-247 are executed sequentially, one per iteration of loop 200. Put another way, each low priority task is serviced every "N" timer iterations, where "N" is the number of tasks in the task list.

In this embodiment, the timer 210 that controls the initiation of each iteration of loop 200 is a set to allow sufficient time for completion of all of the high priority tasks and any one of the lower priority tasks (as well as the incrementing of the task counter). In other embodiments, it may be desirable to shorten the timer cycle to provide more frequent updates of the sensor output reading generated by the controller. In this instance, there may not be sufficient time to complete the selected lower priority task. Provisions may therefore be made in the design to allow for incomplete execution of a selected task and resumption or re-execution of the task at a later time. Alternatively, it may not be necessary to frequently update the sensor output reading of the controller. In this instance, it may be possible to increase the interval of the timer so that more than one of the lower priority tasks can be completed in a single iteration of the loop. Other variations may also be possible.

Using the kernel control loop shown in FIG. 2, each task completes before the next timer interrupt occurs. This sequential process ensures that the gauge control system is able read, linearize, and output chamber pressure in a precisely periodic manner while also servicing all other gauge functions. This control flow effectively prioritizes computational resources for the purpose of maximizing gauge accuracy and performance, while still ancillary functions.

Figure 3:
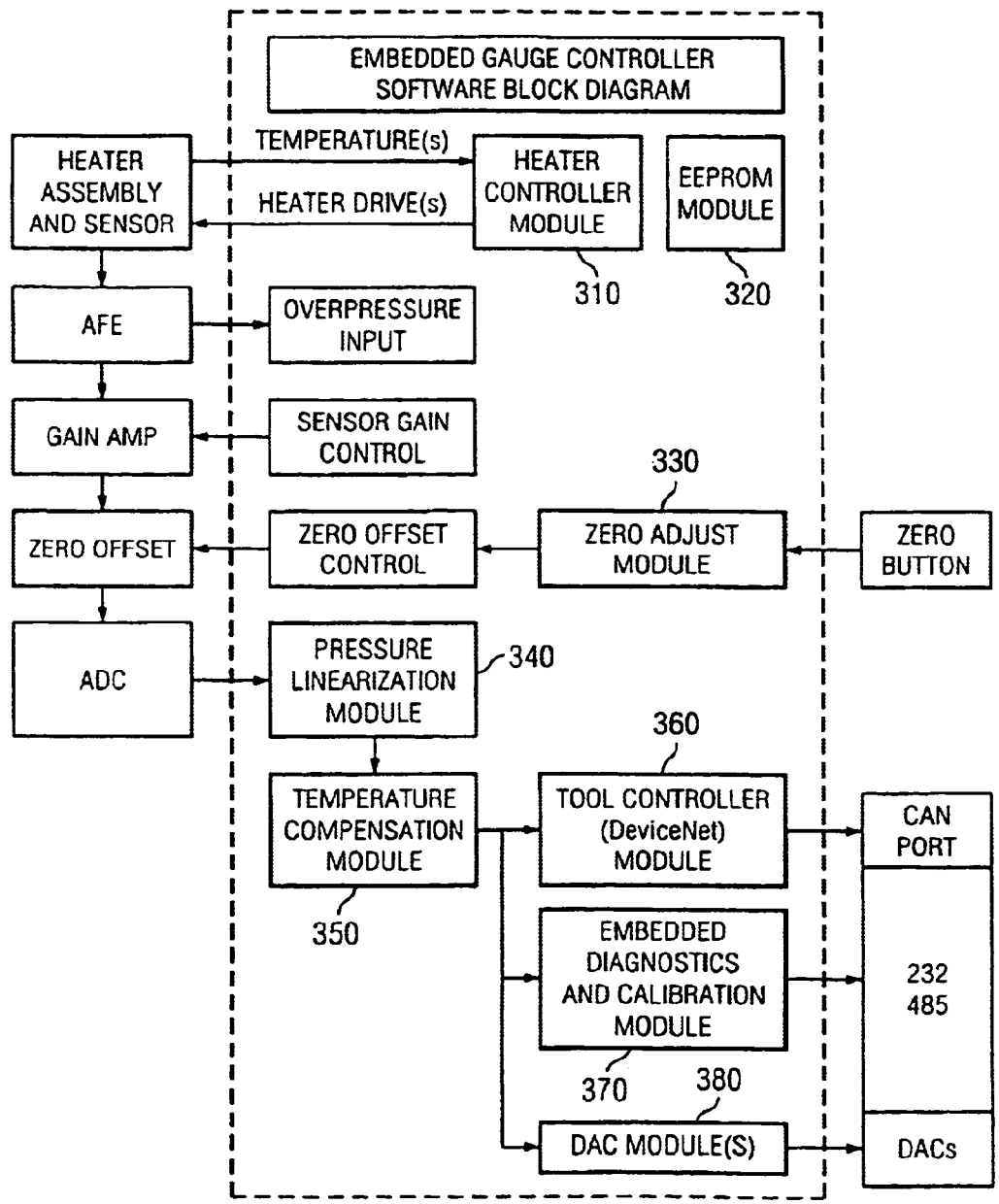
FIG. 3 is a block diagram illustrating the gauge controller module of the embedded system in one embodiment.

Controller Module. As mentioned above, the controller module executes the tasks of the embedded controller as resources are allocated by the kernel. The structure of the controller module is shown in FIG. 3. The structure is described below with reference to the figure.

In one embodiment, the controller module software is programmed into a DSP. (It should be noted that "software" as used here refers to a set of program instructions configured to cause the DSP to perform a designated task, and is intended to include software, firmware and hard-coded instructions.) The controller module is configured to receive data from the heater assembly and sensor, the AFE and the analog-to-digital converter. The controller module also receives control input from the zero button (when a user pushes the button to initiate the automatic re-zeroing process). The controller module provides output data in this embodiment to the CAN port, the digital-to-analog converter and the diagnostics port (RS232/485). The controller module provides control output to the analog zero offset and gain components, as well as the heater assembly and sensor.

Controller module 300 includes a heater controller module 310 that is configured to receive temperature data from temperature sensors coupled to sensor 10. Heater controller module 310 processes this data to determine whether the temperature of sensor 10 is appropriate and to adjust the temperature if necessary. This may involve separately controlling multiple heating components corresponding to different zones of sensor 10. Heater set point and tuning values are stored in the EEPROM and are restored on power-up.

Zero adjust module 330 is configured to initiate the zero offset adjustment procedure in response to a signal received from the zero button. Zero adjust module 330 automatically determines the drift of the sensor and/or analog front end so that it can be corrected. In other words, zero adjust module 330 determines the adjustment necessary to cause the sensor signal digitized by the analog-to-digital converter to be zero when the pressure is effectively zero (i.e., below a minimum resolvable pressure.) This information can then be sent to a zero offset control module, which in turn causes the actual adjustment of the zero offset hardware module. The adjustment is stored in the EEPROM and is restored on power up.

It should be noted that, in one embodiment, zero adjust module 330 incorporates a lock out feature. This prevents zero offset adjustment if the appropriate conditions for the adjustment (those for which the adjustment can be properly executed) are not met. In other words, the automatic zero offset adjustment procedure is locked out. The specific conditions that must be met in this embodiment are that the pressure at the sensor is below a predetermined threshold, the sensor temperature is at the desired setpoint, the ambient temperature of the electronics is within a predetermined range, and no fault conditions are present in the controller.

EEPROM module 320 is configured to manage the storage of data in the EEPROM (electronically erasable programmable read only memory). The EEPROM module stores gain and zero adjust values, configuration data, historical diagnostic data, and heater configuration and control data. As noted above, the linearization constants that are computed by controller module 300 are also stored in the EEPROM. These constants are used by pressure linearization module 340 to convert the non-linear digitized signal received from the analog-to-digital converter into a linear pressure signal that can be output through the appropriate ports. It should be noted that the linear pressure signal produced by pressure linearization module 340 may have to be processed by temperature compensation module 350 in order to correct for changes in ambient temperature.

Once the pressure signal is linearized and temperature compensated, it can be sent to the appropriate output modules. In one embodiment, these modules include a tool controller module 360 that is configured to control output to a CAN port (which may be made available a DeviceNet network), an embedded diagnostics and calibration module 370 that is configured to control output to the dedicated diagnostics port, and a digital-to-analog converter module 380 that is configured to control output to the digital-to-analog converter.

Embedded diagnostics and calibration module 370 enables communication between the controller module and an external device such as a calibration stand or a PC. The controller can therefore perform diagnostic procedures using the digital signal data and internal controller data and then communicate this information to a user. It should be noted that the particular diagnostics performed may vary from one embodiment to another, so no specific procedures will be discussed here. The programming of particular procedures is believed to be within the abilities of a person of ordinary skill in the art of the invention. The diagnostics may produce indications of fault conditions, which may in turn be communicated to a user, used to drive LED indicators, used for other diagnostic procedures and so on. In one embodiment, the fault conditions are recorded in a historical database for later analysis.

The calibration performed by embedded diagnostics and calibration module 370 also utilizes communications from an external device, i.e., a calibration stand. The module is configured to receive data downloaded from the calibration stand, such as calibration constants or other data describing the multivariable response function utilized in the calibration procedures. This information can then be used, along with internal variables such as the unprocessed sensor signal, the ambient temperature, sensor temperature and the overpressure signal, to adjust the variable gain and zero offset hardware modules to obtain optimized input data.

It can be seen from FIG. 3 that, in addition to the zero offset control module which controls the offset of the analog sensor signal, controller module 300 includes a sensor gain control module. This module controls the programmable gain hardware module that amplifies the analog sensor signal from the analog front end. This allows the most appropriate signal level to be provided to the input of the analog-to-digital converter. Both the amplifier gain and zero adjust values are stored in EEPROM and are restored at power up. Controller module 300 additionally includes an overpressure input module that is configured to sense an overpressure condition in the analog front end.

In addition to the embodiments of the invention described above, there are various alternative embodiments that are within the scope of the present disclosure. For example, one alternative embodiment may comprise a sensor system having a sensor, an analog front end, an analog-to-digital converter and a digital controller, as described above. This system may include other hardware components, alone or in combination. These components may include a sensor heater, a variable gain module, a zero offset module, a memory (e.g., an EEPROM), communication ports, calibration stands, PCs, PDAs, networks, or other external equipment.

Other embodiments may comprise methods. For example, one alternative embodiment comprises a method for performing a zero adjustment. This method includes the following steps: detecting a zero adjust command (e.g., from a user pushbutton switch, a contact closure, or a digital command from a communication ports); sensing the zero offset value of the inlet pressure signal; digitally removing the zero offset signal from the linearized pressure output signal; and updating the zero adjust status variable. This method may further include the steps of indicating the success or failure of the zero adjust operation, performing the procedure only if predetermined conditions are met (otherwise locking out the procedure), and so on.

Yet another alternative embodiment may comprise a method for calibrating a sensor such as a capacitance diaphragm gauge. The steps of this method may comprise: measuring the actual pressure at the sensor inlet; sensing a series of system variables associated with the capacitance diaphragm gauge (e.g., unprocessed input pressure signal, ambient temperature signal, sensor temperature signals or overpressure signal); controlling another series of system variables associated with the capacitance diaphragm gauge (e.g., sensor gain amplifier value or zero offset value); modeling the pressure with a regression technique to produce a multivariable response function describing the gauge pressure in terms of the system variables; and inputting the multivariable response function into an embedded control system to enable the output of a pressure signal.

The benefits and advantages which may be provided by the present invention have been described above with regard to specific embodiments. These benefits and advantages, and any elements or limitations that may cause them to occur or to become more pronounced are not to be construed as a critical, required, or essential features of any or all of the claims. As used herein, the terms "comprises," "comprising," or any other variations thereof, are intended to be interpreted as non-exclusively including the elements or limitations which follow those terms. Accordingly, a process, method, article, or apparatus that comprises a list of elements does include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A pressure sensing system comprising:
    a pressure sensor;
    an analog front end module, coupled to the pressure sensor, to produce an analog pressure sensor signal;
    an analog-to-digital converter to convert the analog pressure sensor signal to a digital sensor signal; and
    a digital controller configured to receive the digital sensor signal, linearize the digital sensor signal, and provide an output signal that is based upon the linearized digital sensor signal during each iteration of a control loop executed by the digital controller in which the digital controller performs at least one additional task.

2. The pressure sensing system of claim 1, wherein the digital controller is configured to provide the output signal that is based upon the linearized digital sensor signal by at least one of writing the output signal to a digital-to-analog converter and writing the output signal to one or more port buffers.

3. The pressure sensing system of claim 2, wherein the at least one additional task includes at least one or more of:
    processing communication messages received from a diagnostics port;
    processing control area network messages;
    performing ambient temperature compensation;
    performing a closed loop heater algorithm;
    servicing temperature LEDs;
    monitoring overpressure and zero adjust inputs;
    servicing status LEDs and switches;
    servicing an EEPROM;
    performing an automatic analog scaling procedure;
    performing an automatic zero adjust procedure; and
    performing an embedded diagnostic procedure.

4. The pressure sensing system of claim 3, further comprising:
    a variable gain module, coupled between the analog front end module and the analog-to-digital converter, to adjust a gain of the analog pressure sensor signal prior to digitization by the analog-to-digital converter.

5. The pressure sensing system of claim 4, further comprising:
    a zero offset module, coupled between the variable gain module and the analog-to-digital converter, to adjust a zero offset of the analog pressure sensor signal prior to digitization by the analog-to-digital converter.

6. The pressure sensing system of claim 5, wherein the variable gain module and the zero offset module each receives a respective digital control signal from the digital controller to respectively adjust the gain and the zero offset of the analog pressure sensor signal.

7. The pressure sensing system of claim 1, wherein the at least one additional task includes at least one or more of:
    processing communication messages received from a diagnostics port;
    processing control area network messages;
    performing ambient temperature compensation;
    performing a closed loop heater algorithm;
    servicing temperature LEDs;
    monitoring overpressure and zero adjust inputs;
    servicing status LEDs and switches;
    servicing an EEPROM;
    performing an automatic analog scaling procedure;
    performing an automatic zero adjust procedure; and
    performing an embedded diagnostic procedure.

8. The pressure sensing system of claim 1, further comprising:
    a variable gain module, coupled between the analog front end module and the analog-to-digital converter, to adjust a gain of the analog pressure sensor signal prior to digitization by the analog-to-digital converter.

9. The pressure sensing system of claim 8, wherein the variable gain module receives a digital control signal from the digital controller to adjust the gain of the analog pressure sensor signal.

10. The pressure sensing system of claim 8, further comprising:
    a zero offset module, coupled between the variable gain module and the analog-to-digital converter, to adjust a zero offset of the analog pressure sensor signal prior to digitization by the analog-to-digital converter.

11. The pressure sensing system of claim 1, further comprising:
    a zero offset module, coupled between the analog front end module and the analog-to-digital converter, to adjust a zero offset of the analog pressure sensor signal prior to digitization by the analog-to-digital converter.

12. The pressure sensing system of claim 11, wherein the zero offset module receives a digital control signal from the digital controller to adjust the zero offset of the analog pressure sensor signal.

13. A method for controlling a pressure sensing system comprising acts of:
   receiving an analog pressure sensor signal;
   converting the analog pressure sensor signal to a digital sensor signal;
   reading the digital sensor signal;
   linearizing the digital sensor signal;
   providing an output signal based upon the linearized digital sensor signal; and
   performing at least one additional task;
   wherein the acts of reading, linearizing, and providing are performed by a digital controller during each iteration of a control loop executed by the digital controller in which the digital controller performs the at least one additional task.

14. The method of claim 13, wherein the act of providing the output signal includes at least one of writing the linearized digital sensor signal to a digital-to-analog converter and conveying the linearized digital sensor signal to one or more port buffers.

15. The method of claim 14, wherein the at least one additional task includes at least one or more of:
   processing communication messages received from a diagnostics port;
   processing control area network messages;
   performing ambient temperature compensation;
   performing a closed loop heater algorithm;
   servicing temperature LEDs;
   monitoring overpressure and zero adjust inputs;
   servicing status LEDs and switches;
   servicing an EEPROM;
   performing an automatic analog scaling procedure;
   performing an automatic zero adjust procedure; and
   performing an embedded diagnostic procedure.

16. The method of claim 15, further comprising an act of:
   digitally adjusting a gain of the analog pressure sensor signal prior to the act of converting the analog pressure sensor signal to a digital sensor signal.

17. The method of claim 16, further comprising an act of:
   digitally adjusting a zero offset of the analog pressure sensor signal prior to the act of converting the analog pressure sensor signal to a digital sensor signal.

18. The method of claim 17, wherein the act of digitally adjusting the gain is performed prior to the act of digitally adjusting the zero offset.

19. The method of claim 13, further comprising an act of:
   digitally adjusting a gain of the analog pressure sensor signal prior to the act of converting the analog pressure sensor signal to a digital sensor signal.

20. The method of claim 13, further comprising an act of:
   digitally adjusting a zero offset of the analog pressure sensor signal prior to the act of converting the analog pressure sensor signal to a digital sensor signal.

* * * * *